US00RE34550E

United States Patent [19]

Bowman

[11] E Patent Number: Re. 34,550

[45] Reissued Date of Patent: Feb. 22, 1994

[54] STURDY ADJUSTABLE MANHOLE COVER SUPPORT

[76] Inventor: Harold M. Bowman, 188670 N. Valley Dr., Fairview Park, Ohio 44126

[21] Appl. No.: 897,282

[22] Filed: Jun. 11, 1992

Related U.S. Patent Documents

Reissue of:

[64] Patent No.: 4,867,601
Issued: Sep. 19, 1989
Appl. No.: 207,266
Filed: Jun. 15, 1988

U.S. Applications:

[63] Continuation of Ser. No. 578,007, Aug. 31, 1990, abandoned, which is a continuation-in-part of Ser. No. 76,668, Jul. 23, 1987, Pat. No. 4,834,574, which is a continuation-in-part of Ser. No. 201,573, Jun. 1, 1988, Pat. No. 4,867,600.

[51] Int. Cl.[5] ..... E02D 29/14
[52] U.S. Cl. ..... 404/26
[58] Field of Search ..... 404/25-26; 52/20-21

[56] References Cited

U.S. PATENT DOCUMENTS

| | | | |
|---|---|---|---|
| 599,457 | 2/1898 | Sanborn | 147/14 |
| 1,580,541 | 4/1926 | Sherman | 285/39 |
| 1,639,495 | 8/1927 | Frame | 404/26 |
| 1,908,909 | 5/1933 | Manz | 52/19 |
| 1,990,909 | 2/1935 | Lambert | 49/73 X |
| 2,109,287 | 2/1938 | Elkington | 404/25 |
| 2,328,068 | 8/1943 | Harris | 220/301 |
| 2,346,361 | 4/1944 | Cupido | 404/25 |
| 2,593,918 | 4/1952 | Redman | 404/26 |
| 2,661,863 | 12/1953 | Howe | 220/321 |
| 2,903,875 | 9/1959 | Bonatz et al. | 52/20 |
| 3,308,727 | 4/1967 | Hurt, Jr. | 404/55 |
| 3,326,100 | 6/1967 | White | 404/26 |
| 3,385,011 | 5/1968 | Sorrell | 404/83 |
| 3,408,778 | 11/1968 | Mason | 404/26 X |
| 3,490,177 | 1/1970 | Perron | 52/19 |
| 3,533,199 | 10/1970 | Pickett | 404/26 X |
| 3,629,981 | 12/1971 | McCaffery | 404/26 X |
| 3,773,428 | 11/1973 | Bowman | 404/26 |
| 3,891,337 | 6/1975 | McCoy | 404/26 |
| 3,911,635 | 10/1975 | Traupe | 52/20 X |
| 4,097,171 | 6/1978 | Fier . | |
| 4,225,266 | 9/1980 | Fier . | |
| 4,302,126 | 11/1981 | Fier . | |
| 4,440,407 | 4/1984 | Gagas | 277/207 A X |
| 4,582,449 | 4/1986 | Vosswinkle | 404/25 |
| 4,582,450 | 4/1986 | Neil | 404/26 |
| 4,648,740 | 3/1987 | Carlson | 404/25 |
| 4,650,365 | 3/1987 | Runnels | 404/25 |
| 4,657,752 | 1/1987 | Centa | 404/25 |
| 4,673,310 | 6/1987 | LeBaron | 404/26 |
| 4,706,718 | 11/1987 | Milo | 404/26 X |
| 4,763,449 | 8/1988 | Vigneron et al. | 404/25 |

FOREIGN PATENT DOCUMENTS

| | | |
|---|---|---|
| 864247 | 2/1971 | Canada . |
| 446210 | 3/1968 | Switzerland . |
| 68210247A | 2/1983 | United Kingdom . |

OTHER PUBLICATIONS

Exhibits A, B, C and D-NUPCO Adjus-to-Grade Manhole Casting brochures (published prior to Jun. 15, 1987, probably in Reiss Declaration of Harold M. Bowman, p. 9, lines 1-3).

One page from Spec. No. 715-13, N.Y. State Dept. of Transportation, Albany, N.Y. Entitled "715-13 Prefabricated Adjustment Rings and Frames For Drainage Units and Manholes"—published prior to 1983.

Consolidated Edison of N.Y., Inc. Drwg E0-16482.B, Rev. 5.

*Primary Examiner*—Ramon S. Britts
*Assistant Examiner*—Nancy Mulcare
*Attorney, Agent, or Firm*—Watts, Hoffmann, Fisher & Heinke Co.

[57] ABSTRACT

An improved manhole cover support adjustable in perimeter and adapted to raise the effective grade of an existing manhole cover receiving structure such as a manhole frame is shown. Integral and substantially coextensive with the upper part of its thin-walled lateral cover keeper portion is a reinforcing wale. The cover support can be in the form of a split ring or a plurality of joined segments. Advantageously, it can have bridged joints and a flexible, compressible retention member on at least a portion of its expanding outer wall member.

58 Claims, 7 Drawing Sheets

STURDY ADJUSTABLE MANHOLE COVER SUPPORT

Matter enclosed in heavy brackets [ ] appears in the original patent but forms no part of this reissue specification; matter printed in italics indicates the additions made by reissue.

REFERENCE TO OTHER APPLICATIONS

[This patent application is a] *This is a continuation of applicant's U.S. patent application Ser. No. 07/578007, filed Aug. 31, 1990 which was a reissue of 07/207,266 which was a* continuation-in-part of applicant's U.S. Patent Application Ser. No. 076,668, filed on July 23, 1987, U.S. Pat. No. 4,834,574 issued, 5-30-89 entitled Utility Cover Extension and the one filed on June 1, 1988, *CIP* entitled Polygonal Manhole Cover Support, Ser. No. 201,573, *now U.S. Pat. No. 4,867,600.*

It also is referenced to the following related U.S. patent applications, all filed on even date herewith; Manhole Cover Support Having Enhanced Grip, Ser. No. 207,326; Manhole Cover Support Resistant To Water Infiltration, Ser. No. 207,325; and Manhole Cover Support With Box Flanging, Ser. No. 207,185. The teachings of those applications are incorporated herein by reference.

BACKGROUND OF THE INVENTION

This invention relates to adjustable manhole cover supports for emplacing over and raising the grade of an existing manhole cover receiving structure.

For simplicity the terms "existing manhole cover receiving structure" and "manhole cover" herein are used to refer to the existing, i.e., fixed in-place frame or other existing seating receptacle for a removable cover or grating that covers an access hole (i.e., hand hole, tool hole, manhole, catch basin or the like), and that cover or grating ordinarily is intended to bear vehicular traffic. The term "manhole cover support" or simply "cover support" here means a structure that fits over the existing manhole cover receiving structure, raises its grade, and thereby accommodates a cover or grating at the new grade. Advantageously, the cover or grating is the same one that was used at the lower grade. The access hole covered is a utility enclosure serving, e.g., an electric, gas, water, sewer or storm drainage system.

Ordinarily the instant cover support finds its use when a roadway such as a street or highway is resurfaced with an added layer of paving material. Typically asphalt concrete, or otherwise is overlaid or repaved to establish a higher grade. It then is advantageous to mount the inventive cover support atop the existing manhole receiving structure. Prior art on manhole cover supports and manhole cover frames can be found in U.S. Pat. Nos. 4,281,944, 4,236,358, 3,968,600, 3,773,428, 4,097,171, 4,302,126, 3,891,337 and 1,987,502. The first four of these are for inventions of the applicant.

Axle loads up to 40,000 pounds must be resisted by many of these cover supports as well as serious impact loads from vehicles and snow plows, a variety of temperature effects, steam leaks, spillage, etc., without permitting a hazardous dislocation of the cover support or its cover. Often it is desirable also to cushion the cover a bit for resisting wear or reducing noise, or to seal the cover and its cover support against a substantial and possibly overloading infiltration of surface water, e.g., storm drainage that otherwise would enter a sanitary sewer system at various manhole locations. Adjustability of the cover support in peripheral dimension and height also is important for accommodating the wide range of specifications to be met.

Installing, adjusting, loading and unloading and otherwise handling manhole cover supports and removing the covers therefrom usually is done with powerful and indelicate tools such as picks, pinch bars, crowbars, tongs, heavy hooks and the like. Deformation of the cover support can occur, particularly about its upper edge which is nearest the road surface. Also, the upper edge usually is the handiest area for applying lifting and other tools. Deformations of the edge never are good, and they can render the opening of the support unfit for service. Hence, overall ruggedness and stiffness against deformation, especially at or near the top rim, and resistance to displacement are major concerns about manhole cover supports.

On the other hand, a relatively light construction of the cover support, in comparison to the ponderous cast iron frame that usually initially supports the manhole cover when the first paving is laid, can be very desirable, provided, however, that an inordinate amount of the ruggedness, stiffness, and resistance to displacement or dislodgement is not sacrificed. Usually a main place for weight reduction is in the lateral keeper for the cover. Another place is in the base of the cover support. Clearly, the economics of manufacture, handling and installation all are generally in favor of lower weight. A relatively thin wall keeper would normally be of steel, the wall rarely being more than about 0.1 inch (12 ga.) thick, usually less.

The instant cover support permits the combining of a reasonably low overall weight with a high degree of general ruggedness and of even stiffness.

Additionally, the inventive cover support can be adapted readily to be sealed off against water infiltration, to cushion the cover, and to grip the existing manhole cover structure strongly by friction.

No previously proposed adjustable manhole cover support known to the inventor can combined such ruggedness with light to moderate weight, let alone permit, in addition, one or more of the other desirable features noted above.

BROAD STATEMENT OF THE INVENTION

The instant invention is an improved manhole cover support that is adapted for raising the effective grade of an existing manhole cover receiving structure wherein the base of the cover support body rests on the sill of the receiving structure having a shoulder with a top, the outer wall of the base faces the upwardly-extending inner shoulder surface of the receiving structure, the base has at least one adjustable joint adapted for expanding the outer wall against the shoulder surface, and a relatively thin-walled lateral keeper for the cover projects upwardly from the cover seat of the cover support. The improved cover support is characterized particularly by a reinforcing wale that is integral with and substantially coextensive with the upper part of the keeper; the wale is disposed to clear the top of the shoulder of the receiving structure.

BRIEF DESCRIPTION OF THE DRAWINGS

FIG. 1 is a top plan view of a preferred split-ring embodiment of the instant cover support adapted to fit a circular manhole and having a bonded-on retention component;

FIG. 2 is a vertical cross section of FIG. 1 taken through Section A—A;

FIG. 3 is a vertical cross section of FIG. 1 taken through Section B—B;

FIG. 4 is a side elevation view of the cover support of FIG. 1;

FIG. 5 is a top plan view of an all-metal split ring embodiment of the instant cover support also adapted to fit a circular manhole. The joint is bridged by an extension of the wale;

FIG. 6 is a vertical cross section of FIG. 5 taken through Section A—A;

FIG. 7 is a vertical cross section of FIG. 5 taken through Section B—B;

FIG. 8 is a side elevation view of the cover support of FIG. 5;

FIG. 9 is a top plan view of a preferred four-segmented embodiment of the instant cover support with the joints bridged by rods. This embodiment can develop a superior frictional grip against the shoulder of an existing manhole receiving structure; and FIG. 10 is a top plan view of another form of preferred split ring embodiment of the cover support with a solid wale welded just under the top rim of the keeper;

FIG. 11 is a vertical cross section of FIG. 10 taken through Section A—A;

FIG. 12 is a vertical cross section of FIG. 10 taken through Section B—B;

FIG. 13 is a side elevation view of the cover support of FIG. 10; and

BEST MODES FOR CARRYING OUT THE INVENTION

Figure 1:
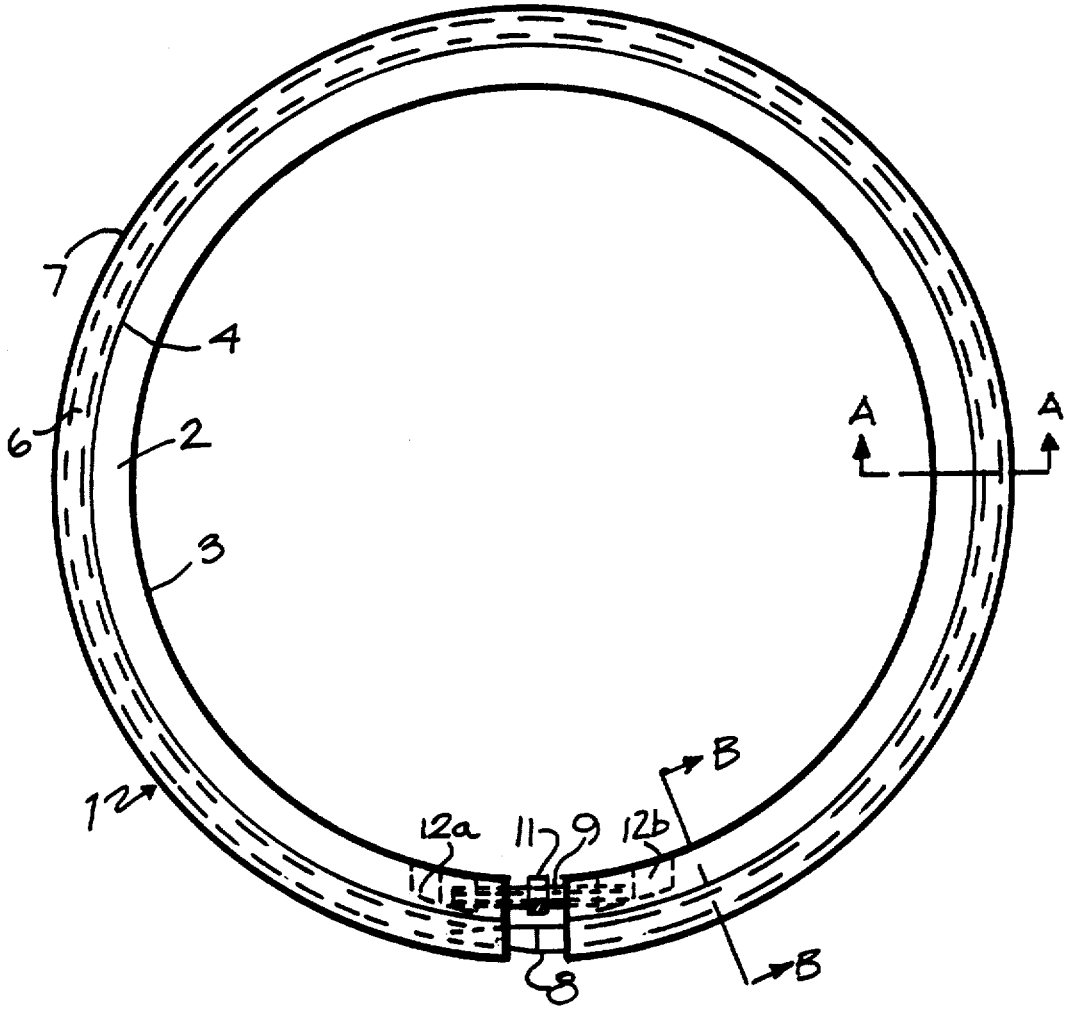
FIGS. 1-13 illustrate adjustable cover supports with practically vertically rising cover keeper walls. Such keepers necessarily must be thin-walled to fit into an existing frame and still accommodate the original cover. In other words, that cover must lie flat on the new seat that is bounded by the walls of such keeper.

Reference is made to FIG. 1. The cover support broadly is indicated by arrow 1. Seat 2 for the cover is the top of the cast ductile iron (ASTM type 536, grade 60-45-12) base of this cover support. Its inner vertical wall is item 3. Welded to and rising up from the outside top edge of the base is a lateral keeper 4 for the cover. The keeper of 13 ga. (0.09395") steel. The top 6 of the keeper is formed into a hollow wale having outside wall 7.

The base and keeper, including the wale, form an almost complete circular pattern which is interrupted only by a joint that is connected with the turnbuckle bolt 9 and is bridged with tapered steep shaft 8. The bolt 9 is of A.1.S.1. type 302 stainless steel.

The right end of the shaft is of essentially square cross section, and it makes a snug fit into, and is welded into, the hollow channel part of the wale. The left end of the shaft 8 is somewhat tapered, and it makes a slidable fit into the other end of the hollow channel part of the wale. Thus, the entire wale can be considered to be the box flanging around the upper periphery of the keeper and the shaft 8 across the joint.

The ends of turnbuckle bolt 9 are threaded with opposite handedness to open up the gap of the joint when turned one way, and to close the gap when turned the other way with a wrench acting on wrench grip 11. For security in service, a nylon locking patch is applied to the bolt threads. The bolt 9 runs into horizontal bolt holes in the base. The holes are tapped appropriately for bolt adjustment and extend to reach the notches 12a and 12b. The notches accept the protruding ends of bolt 9 when the gap is shortened.

If a greater amount of peripheral adjustment and greater frictional grip of the base into a manhole frame or the like is desired, a pair of two pairs (or more) of diametrically opposed joints of the type connected by bolt 9 can be used in the cover support. Thus, the cover support will be made of two or four (or more) segments, usually of equal size if the cover is circular. However, if the cover support is rectangular or otherwise polygonal or oval in plan, the joints can be at corners or on the sides; the resulting connected segments, while usually making a generally symmetrical whole in plan, will not necessarily be of equal size.

Figure 2:
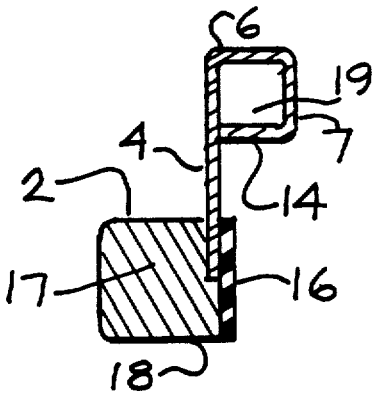

The elements of the cross section shown in FIG. 2 include those with the same numbers as used in FIG. 1 plus these: 17, the cast ductile iron base; 19, the hollow channel of the wale; 14, the bottom of the wale which can be tack-welded along the outside of keeper 4; seat 2 for the cover; bottom 18 of the base which is to rest on the existing manhole cover receiving element; and a frictional retention member 16 which is about an eighth inch thick of slightly foamed elastomer bonded to the base all around its outer perimeter. Sheet steel keeper 4 is welded to base 17 and any lumps, spatter, etc. are removed, e.g., ground off, the outer and inner seams that it makes with the base.

Figure 3:
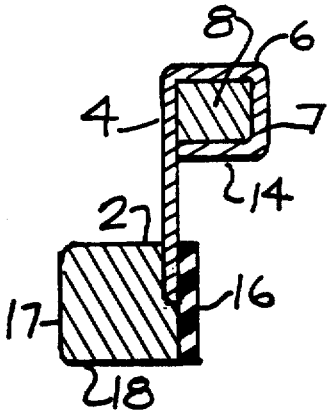

The elements of FIG. 3 are the same as those of FIG. 2 except that the wale at this zone includes shaft 8 as an integral (e.g., welded-in) part.

Figure 4:
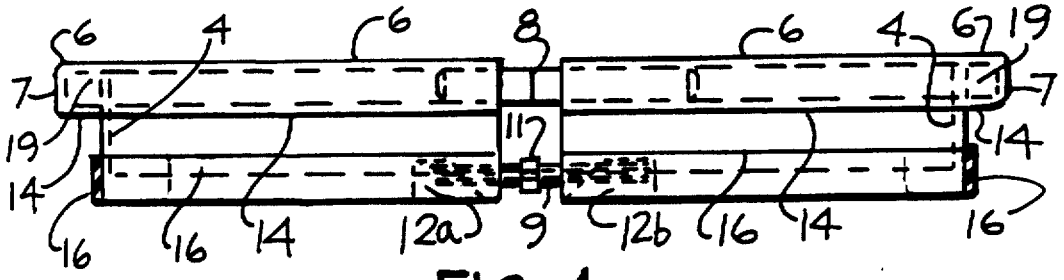

The elements of FIG. 4 that also are shown in FIGS. 1, 2 and 3 have the same numbers as in those figures. Thus, item 16 is the retention component, 8 the shaft and 19 the hollow channel of the wale, 9 the turnbuckle bolt, 17 the wrench grip of the bolt, and 12a and 12b the left and right notches, respectively, for permitting protrusion thereinto of the bolt ends. Optionally, if the retention component is not expected also to help seal out water as at least part of a seal element, can be made in the form of a plurality of incomplete lines, stripes or spots bonded to the surface instead of being in a sheet or film conformation. If desired also, the retention component can be a separate strip or strips of polymer interposed between the base and the existing manhole cover receiving structure. Furthermore, it can be in the form of one or more bands or O-rings surrounding and elastically gripping the base, e.g., in grooves therein.

The cover support embodiment shown in FIGS. 1, 2, 3 and 4 has a good frictional grip to an existing manhole cover frame. This is because the coefficient of static friction between the surface of deformable polymers, including many foamed elastomers, and metal surfaces can be much greater than that between two metal surfaces. Thus, the coefficient of static friction for the contact of a desirable polymer to a metal should be at least about 0.4, and generally it can be as high as 0.6–0.7 or higher. In a steel-to-steel instance it is unlikely to be as high as 0.35. Shore A Durometer hardness of the polymer composition preferably is at least about 20, and preferably is about 50–70. Usually, the thickness of a retention component will be between about 0.4 and 400 mils. Oil resistance can be desirable for it and the other water-sealing elements in some installations.

The coefficient of static friction is the ratio of the maximum force parallel to the surface of contact which acts to prevent motion between two bodies at rest in contact with each other from sliding over each other, to the force normal to the surface of contact which presses the bodies together. Thus, the turnbuckle spreaders at joints supply a large measure of pressure, and the bonded elastomer heightens friction, thereby making a cover support that is unusually effective for resisting dislodgement or tilting in highway service. Means for locking down the cover support to an existing manhole cover flange, e.g., like the means shown in U.S. Pat. No. 3,773,428, often are desirable in addition to simply a frictional grip, and often can be imperative for cover supports of fixed perimeter or for some rectangular or square ones of adjustable perimeter.

Figure 5:
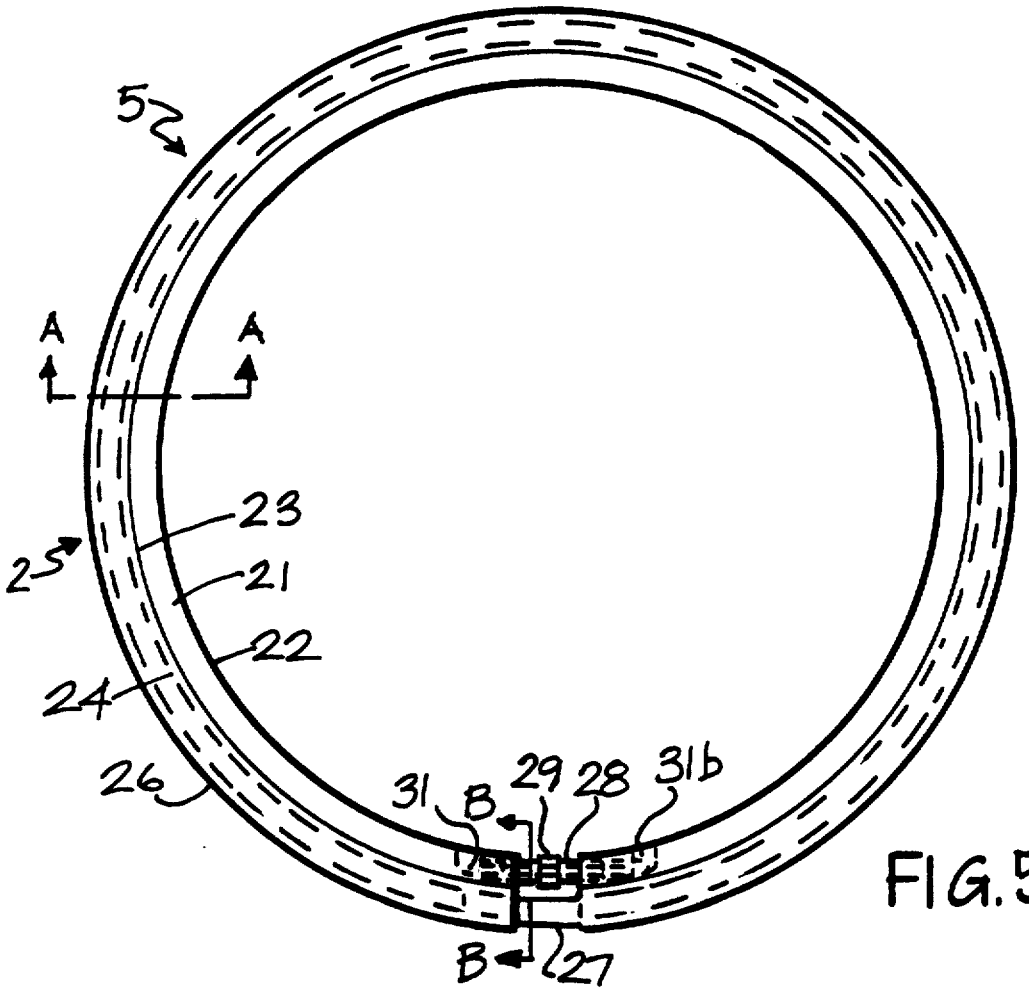

The cover support of FIG. 5 broadly is indicated by arrow 5. This cover support differs from that of FIG. 1 mainly in the following particulars: it has no retention component; the channel of the encircling wale has a different cross section; and a top extension 27 of the wale is bent where it projects from the channel to fit slidably into the other end of the channel and bridge the joint gap. Thus, 21 is the seat for the cover, 22 the inside wall of the base, 23 the keeper for the cover, 24 the top of the wale, 26 the outside periphery of the wale, 27 the top extension or tang of the wale, 28 the turnbuckle bolt, 29 its wrench grip, and 31a and 31b the notches for permitting protrusion of the bolt ends thereinto.

Figure 6:
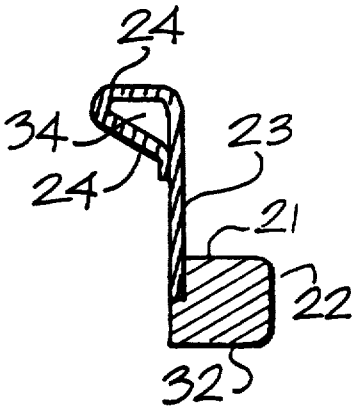

FIG. 6 shows additionally the channel 34 and the bottom 32 of the base of the cover support of FIG. 5. The joint made by wale portion 26 and keeper 23 is spot-welded.

Figure 7:
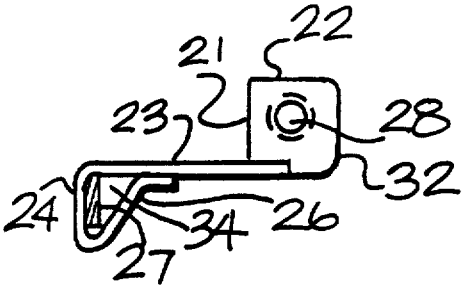

FIG. 7 shows still further the cross section of tang 27 and bolt 28 of the cover support of FIG. 5.

Figure 8:
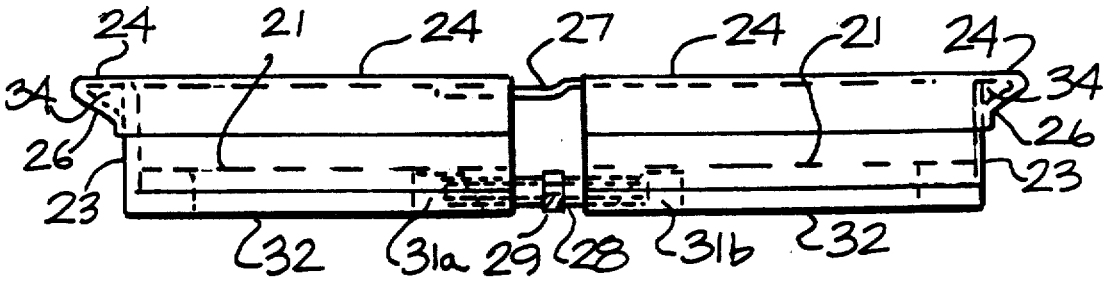

The elements of FIG. 8 that also are shown in FIGS. 5, 6 and 7 have the same numbers as in those figures. Thus, item 21 is the seat, 27 the tang, 24 the top, 26 the side, and 34 the channel of the wale, 23 the keeper, 32 the bottom of the base, 28 the turnbuckle bolt, 29 its wrench grip, and 31 and 32 the notches for permitting protrusion of the bolt ends thereinto.

Figure 9:
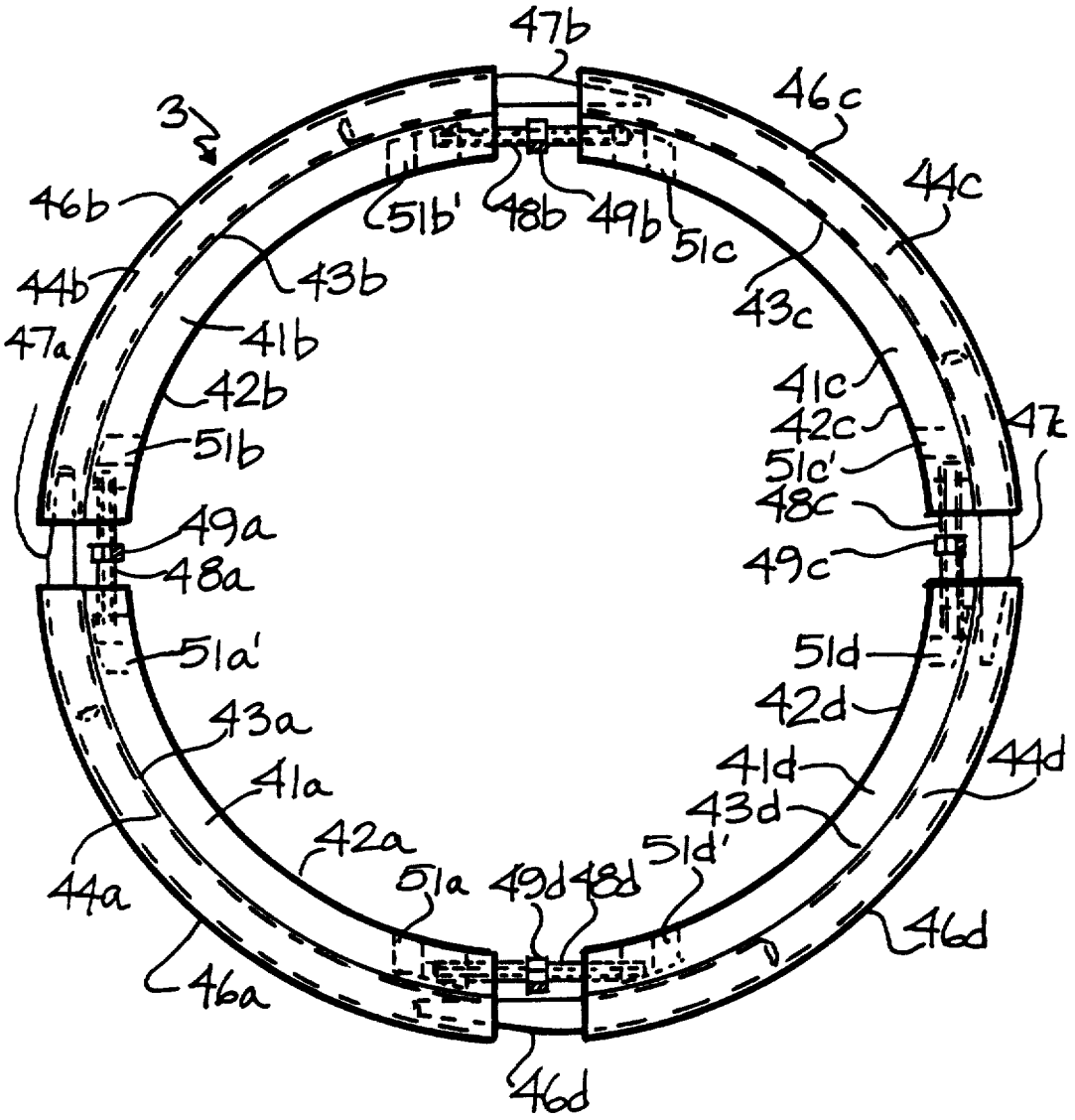

In FIG. 9 the body of a manhole cover support is in four like segments and is referred to broadly by arrow 3. Its metal body differs from that of FIG. 1 mainly in that respect, the cover support of FIG. 1 being simply a split ring. The multi-segmented cover support of FIG. 9 is capable of greater adjustment and a much greater frictional grip to the shoulder of an existing manhole frame than is a corresponding split ring cover support. For simplicity, the cover support of FIG. 9 is depicted without interposed retention component and sealing elements (like item 16 of FIGS. 2, 3 and 4). However, that component could be applied to each segment shown in FIG. 9 in the same way as it was to the embodiment earlier illustrated in those figures. Use of such component with the four-segmented support can further increase its frictional retention grip even more.

In FIG. 9 cover seat portions are 41a, b, c and d; inner wall portions of the cast ductile iron base are 42a, b, c and d; the rising 13-gauge steel keeper portions are 43a, b, c and d; the turnbuckle bolts are 48a, b, c and d; their wrench grips are 49a, b, c and d; the top of the keeper portion is a box flange portion having top portions 44a, b, c and d and side portions 46a, b, c and d; shafts 47a, b, c and d connect the channels of the opposing box flange portion ends and bridge the four joint gaps; and notches 51a, a', b, b', c, c', d and d' are disposed to permit protrusion thereinto of the ends of bolts 48a, b, c and d. The tapered ends of the shafts fit slidably into the channel portions of the box flange portions and their other ends are welded into the channel portions. Because of the remaining similarities between the metal bodies of FIGS. 1 and 9, additional views of the embodiment of FIG. 9 are not needed to understand the embodiment clearly.

Figure 10:
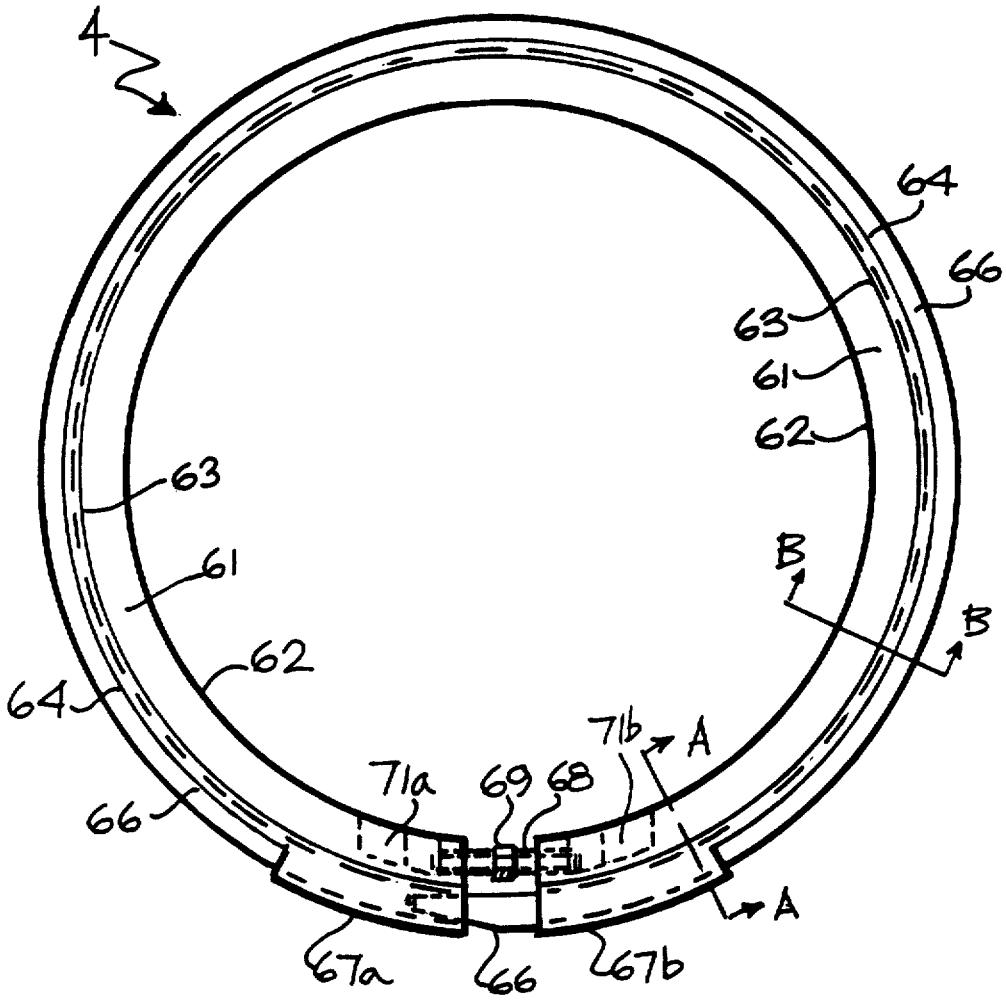

The cover support of FIG. 10 is referred to generally by arrow 4. Its metal body has much the conformation of that depicted in FIG. 1. However, the wale is formed mainly by a square cross-section solid steel rod 66 that starts at sleeve 67a and continues around clockwise through the sleeve 67b to project its tapered end back into sleeve 67a with a sliding fit therein. (The steel rod, alternatively, could be a tube, if desired.)

The rod 66 otherwise is welded to the outside wall of steel keeper 63 just below the slight lip 64 at the top of the keeper. The rod, 66, the lip, 64 and the sleeves 67a and 67b constitute the elements of the wale.

Cover seat 61 is the top of the base, the side of which is wall 62. The joint between the opposing ends of the base is connected adjustably by turnbuckle bolt 68 that screws into those ends and can extend into notches 71a and 71b if necessary.

Figure 11:
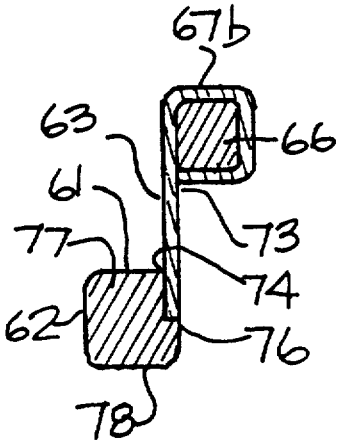

In FIG. 11 item 78 is the bottom of cast ductile iron base 77 and cover seat 61 is its top. The seams 74 and 76 are made along the line where keeper 63 adjoins base 61. The top of the keeper in this cross-section terminates in sleeve 67b containing welded-in rod 66.

Figure 12:
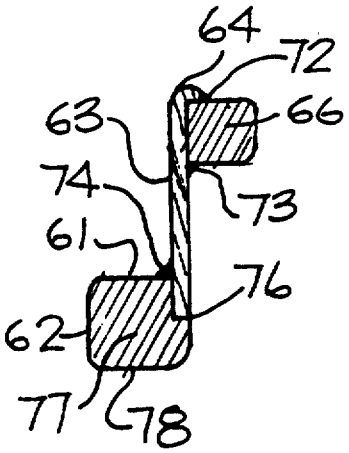

In FIG. 12 keeper 63 is shown with a small weld fillet 74 where it adjoins base 78. The keeper rises to short outward flanging 64. Under this the surrounding rod 66 is welded to the keeper. Small weld fillets 65 and 73 are representative of that.

Figure 13:
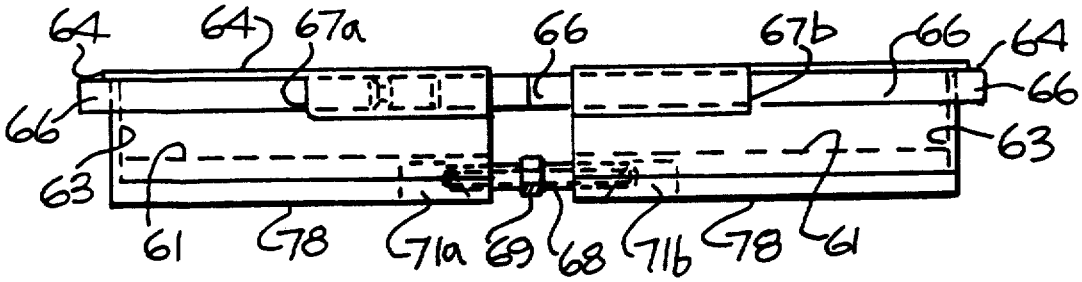

The elements of FIG. 13 that also are shown in FIGS. 10, 11 and 12 have the same numbers as in those figures. Thus, item 61 is the seat, 62 the inner wall of the base, 63 the rising parts of the keeper, 64 its short outward flanging, 66 the surrounding rod, 67a and 67b the sleeves, 68 the turnbuckle bolt, 69 its wrench grip, and 71a and 71b the notches for accepting the bolt ends.

Figure 14:
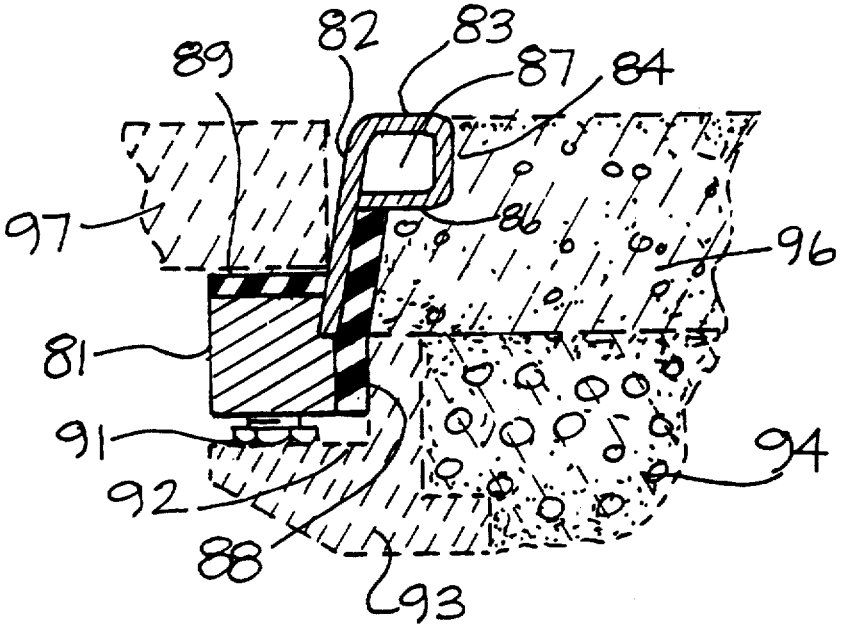
FIG. 14 is a vertical cross section taken at the middle of a segment of a preferred form of height-adjustable, four-segment manhole cover support in a street installation. The cover support has bonded-on coats of elastomer for cushioning the cover and for frictionally retaining the cover support in place. Its metal body is much like that of the embodiment shown in FIG. 9, except that the rising keeper portions have a slight outward slope, e.g., 5°-15°, rather than going practically straight up. Such outward slope often is desirable.

In FIG. 14, a profile cross section of another preferred split-ring type of the cover support installed in a resurfaced street is shown. Steel elevating bolt 91 is one of twenty that can be screwed into and out of the bottom of cast ductile iron base 81, the exterior surface of the head actually becoming practically flush with the base when screwed down fully. (The head fits into a notch, not shown, in the bottom of the base.) Seat 89 and sidewall 88 are formed by bonded-on deformable elastomer layers to the top of the base and on its side and a ways up the outside of the sheet steel cover keeper 82. The keeper terminates with surrounding box flange 83 having channel 87. The adjustable joint between the ends of the split ring is not shown. It is like that of FIG. 1. Alternatively, the cover support could be segmented like that of FIG. 9, if desired, for, more adjustability and greater frictional retention.

Figure 15:
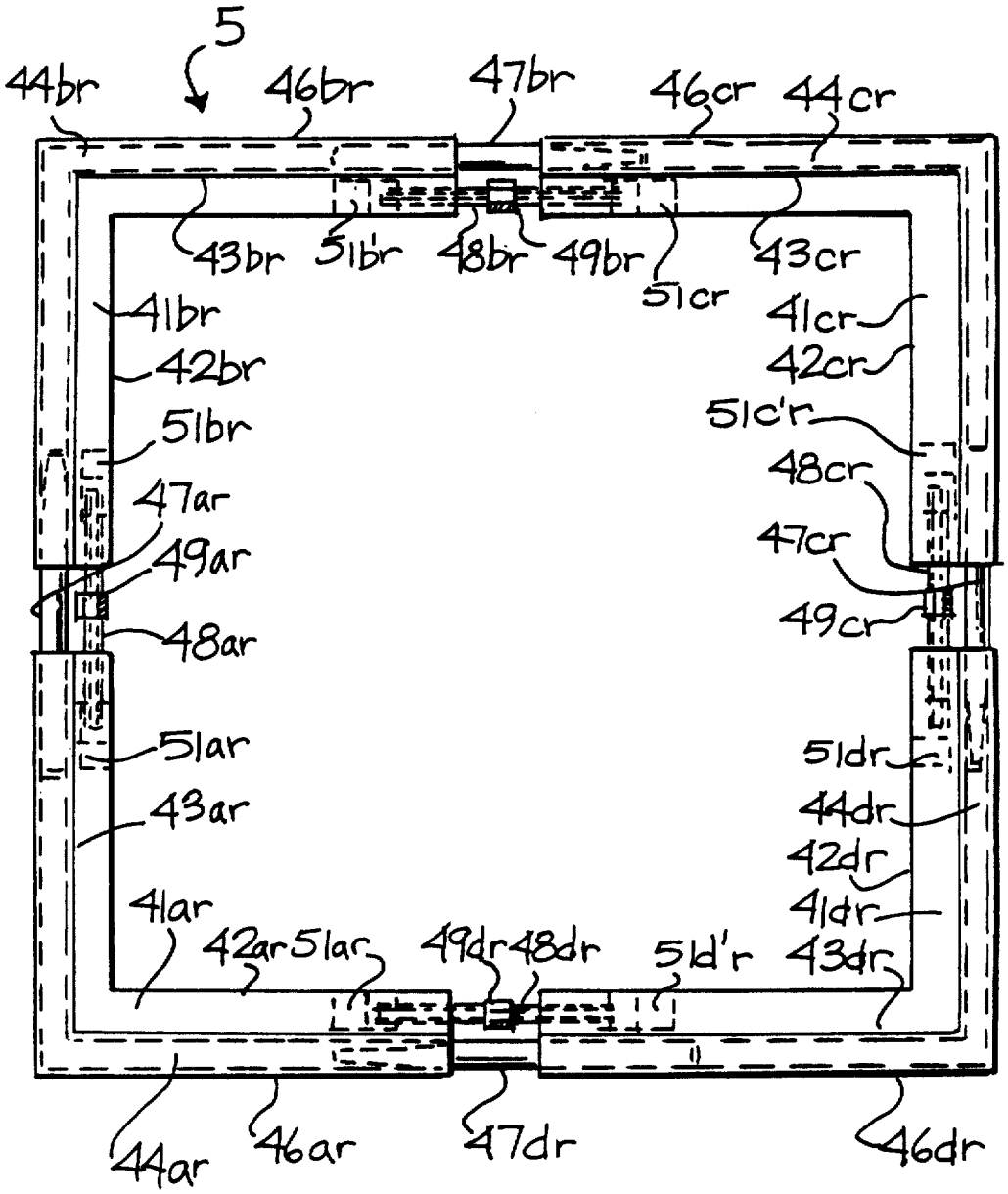
FIG. 15 shows a quadrangular version of the four-segmented cover support depicted in FIG. 9.

FIG. 15 is the squared-off version of the cover support shown in FIG. 9. The functionality of all the referenced parts of FIG. 15 is the same as that of FIG. 9, but to the reference numbers of FIG. 15 there has been added a lower case letter "r" to rendered them distinctive from those of FIG. 9.

The outside surface of bolt 91 rests on sill 92 of an existing cast iron manhole cover frame 93. The perimeter of base 81 is forced by expansion against the rising shoulder of existing manhole cover frame 93 with polymer seal portion-and-retention component 88 interposed therebetween.

Asphalt concrete resurfacing paving layer 96 lies over the original portland cement concrete paving 94. The original paving surrounds the frame 93, and the resurfacing surrounds the cover support projecting above the frame 93. Relocated manhole cover 97 rests on the new seat 89. It is cushioned thereby. It should be noted that the bottom of the wale must be just above the top of the shoulder on frame 93 to have base 81 rest well on sill 92; in other words, the wale should clear the top of the shoulder of the existing receiving structure whether the adjusting bolts are positioned short, long, or left out.

If the adjustable joints of such cover support are plugged with deformable polymer, e.g., elastomer and especially foamed elastomer so that complete water seals result under the manhole cover 81 and all around either the outer perimeter of the cover support base or its cover keeper rising there around, or both, then the cover support can be used to resist stray surface water such as storm drainage.

Suitable sealing plug fitments to be used with the cover support as it is being installed can be made all of polymer or with a core or armature, e.g., one of metal, coated with polymer. Alternatively, the plug can be effected after the cover support is installed by stuffing in or spraying in a sealant, preferably a foaming or foamable-in-place one.

Hollow peripheral encircling wales portions and even hollow base portions can be filled or partly filled with a hard or tough resin, optionally mixed with a mineral filler such as mica or chopped glass fiber strand, to supply some desirable further resistance to crushing and other deformation. Thermosetting resins such as polyester and epoxy resins can be useful in this connection. Also, thermoplastic ones such as ABS resin can be so used, or a concrete such as a Gunnite type.

The cross section of the hollow sleeves and wales may be square or rectangular, etc. They can be made in many other fairly rigid conformations. This also applies to the cross section of solid or tubular wale-forming and base-forming members and joint-bridging rod or tube elements. While only solid bases have been illustrated, it should be clear that they can be made hollow, e.g., like the main part of the wale of FIG. 1. They also can be formed with at least part of the hollow keeper from a single piece of steel, e.g., 12–16 gauge, and optionally with the whole keeper, including the hollow wale portion, from a single steel piece that includes the hollow-channeled base.

While the cover support embodiments depicted are for circular holes, other shapes such as rectangles, triangles, squares, ovals, etc. are usable in accordance with invention principles, provided the cover supports are rendered adjustable as to their perimeter, usually with turnbuckle means.

Reference is made again to FIGS. 2, 3 and 4 which display the bonded polymer retention component 16 and to FIG. 9, which shows a four-segmented circular manhole cover support. In tests on related circular four-segmented manhole cover supports also joined with turnbuckle bolts and having the same kind of adhering foamed elastomer retention component (actually a heat-cured vinyl plastisol retention component) the following significant fact was revealed: pulling directly upward on the expansible cover support that was held in a ring of steel by only the friction between its elastomer-coated periphery and the ring and its own weight (which was only an inconsequential minute percentage of the whole load to be pulled) took much greater force to remove than a like cover support held the same way in the ring with the same hoop stress exerted, but having no such retention member interposed. The force factor was about 1.38 times as much for the coated support as for the uncoated one.

Suitable polymers that can be formulated for use in the compressible retention component and water seals herein include natural and synthetic rubbers, water-resistant ionomers, various vinyl polymers and copolymers such as polyvinyl acetate-polyethylene-acrylate copolymers and polyvinyl chloride homopolymers, polyurethanes, polyester resins, epoxy resins, styrene-containing copolymers such as ABS and butadiene-or isoprene-styrene copolymers, polyolefins and copolymers containing olefin units, and aminoplasts. Plasticizers, pigmentation, stains and/or mineral fillers such as talc, carbon black, etc. commonly are employed in their recipes. The best retention components appear to be elastomeric. Many of them can be foamed and preferably are foamed only very slightly; this can soften them a bit, and it makes them slightly less dense than without the foaming. Latent foaming agents reactive upon warming and/or catalyzing a film of an uncured polymer-providing material coated on a cover support are preferred. Curing with heat, ultraviolet or electron beam radiation and/or catalysis can be practiced.

Customarily, it is of advantage to prime the metal with a bonding agent or use a bonding treatment to secure the best bond of the retention component or a water sealing element to metal. Some polymers can bond well without this, e.g., epoxy resins. However, the bonds of most are improved by such priming and/or treating.

A preferred foamed plastisol formulation for the retention component is of Shore. A Durometer hardness about 20–70, and preferably about 50–65, as are the water seals. The plastisol is compounded principally from low molecular weight polyvinyl chloride resin plasticized heavily with a conventional phthalate ester plasticizer. It contains minute percentages of stabilizer, red pigment and ozodicarbonamide blowing agent. Another preferred formulation of about the sam Short A Durometer hardness is a flexible polyolpolyurethane foam, slightly elastomeric and rubbery. Some polymer recipes need heat to cure and foam, even with catalysis, and others cure and even foam at about room temperature (78° F.). The degree of foaming in both these plastisol and urethane formulations is very small, and it could be called almost microscopic and slight - the bubbles are closed-cell and tiny. In some cases, especially where sealing is to be maximized and strength considerations are secondary, a fair amount of foaming and a resulting softened and less dense foamy structure can be tolerated, e.g., Shore A Durometer hardness of 20–55.

The preferred foamed plastisol usually is sprayed on the area to be coated. It is advantageous to spray it onto the hot metal cover support body (370°–380° F.) and let it cure and foam a bit. If extra foaming and/or curing is desired, the coated part can be further warmed at 380°–400° F. for up to a few minutes.

Metal surfaces should be cleaned to accept the polymeric material if it is to be bonded. Then a customary bonding agent as Chemlok #218 (Manufactured by Lord Corporation, Erie, Pa.) is applied, dried and warmed. Various other useful bonding agents are available such as Pliobond type (made by the Goodyear Tire and Rubber Company).

As shown above the preferred materials of construction for most of the cover support, i.e., the body and various elements of the body, are of a ferrous metal, e.g., steel and/or cast iron, particularly cast ductile iron. Other metals can be used where their special properties are desirable (and their cost can be tolerated), e.g., stainless steel, high tensile strength steel, wrought iron, bronze, brass, etc. Also suitable in some cases are cover support parts and even much of the main body structure fabricated from glass fiber-, aramid fiber-, or graphite fiber-reenforced resin, e.g., a thermosetting resin such as a polyester or epoxy resin, even highly filled polymers including elastomers, or ABS plastic and the like, i.e., tough structural polymeric materials.

The tops of the keeper elements of an all-cast durable iron manhole cover support generally are quite stiff and traffic-resistant because they are fairly thick. For lighter weight, and especially for making the lowest initial investment, there has been a great attraction towards the use of the fairly thin, e.g., 12–18 ga., steel keepers having very little outward flanging at the top. The top edge protrudes, if at all, only to about the thickness of a cast iron keeper or perhaps twice that at most.

There are many installations where such economy of investments is the rule. It is not uncommon to find that a significant fraction of the cover supports in those installations are in need of expensive maintenance, repair and/or replacement after a few short years of heavy service.

The inventive cover supports here, with their relatively thin keeper walls, are fairly light for their sizes. However, they are many times stiffer than the light, but unflanged or only slightly-flanged types.

Modifications and variations of the invention will be apparent to those skilled in the art in the light of the foregoing detailed disclosure. Therefore, it is to be understood that, within the scope of the appended claims, the invention can be practiced otherwise than as shown and described.

I claim:

1. A manhole cover support comprising a body having a base portion with a cover seat portion, and a lateral keeper portion integral with the base portion, the keeper portion *being made of relatively thin metal* projecting upwardly from the seat portion, the base portion having at least one adjustable joint means for adjusting the base in peripheral dimension, the transverse wall thickness of the keeper portion being substantially less than the corresponding transverse thickness of the base, the cover support being adapted for raising the effective grade of an existing manhole cover receiving structure wherein the base portion of the support body rests on [the] *a* sill of the receiving structure, [the] *an* outer wall of the base portion faces [the] *an* upwardly-extending shoulder surface of the receiving structure, and expansion of the joint *means* presses the outer wall of the base portion against the shoulder surface of the receiving structure, the cover support including a *relatively rigid, metal* reinforcing wale that is integral with and substantially coextensive with [the] *and adjacent to an* upper part of the keeper portion, *the wale projecting outwardly and downwardly from the upper part of the keeper portion such that at least a portion thereof is in engagement with a confronting surface of the keeper portion and having a width in a lateral direction greater than said transverse wall thickness and extending downwardly from an upper end of said keeper portion for a relatively substantial distance sufficient to provide stiffness against deformation that would occur in conventional, 12–18 ga. steel keepers having very little outward flanging at the top.*

2. The manhole cover support of claim 1 wherein the base portion and the keeper portion are in the form of a split-ring.

3. The manhole cover support of claim 1 wherein the base portion and the keeper portion are in segments.

4. The manhole cover support of claim 1 wherein the wale is substantially solid in cross section.

5. The manhole cover support of claim 1 wherein the wale mainly is hollow.

6. The manhole cover support of claim 1 wherein each adjustably joint is bridged by an extension of the wale.

7. The manhole cover support of claim 5 wherein a tubular or solid shaft fits into and connects pairs of adjacent wale ends.

8. The manhole cover support of claim 5 wherein the wale is substantially rectangular in cross section.

9. The manhole cover support of claim 5 wherein the wale is at least partially arcuate in cross section.

10. The manhole cover support of claim 1 wherein a flexible, compressible retention component is interposed between at least a part of the outer wall of the base portion and the shoulder surface of the existing receiving structure.

11. The manhole cover support of claim 10 wherein the retention component comprises a polymer bonded to the outer wall of the base portion.

12. The manhole cover support of claim 11 wherein the retention component comprises a foamed elastomer.

13. The manhole cover support of claim 11 wherein the retention component comprises a cured plastisol.

14. The manhole cover support of claim 1 wherein the cover support body and the receiving structure are substantially of ferrous metal.

15. The manhole cover support of claim 1 which includes screw means which render the joints adjustable.

16. The manhole cover support of claim 1 wherein the elevation of its base portion is adjustable by screw means.

17. The manhole cover support of claim 1 which is for a substantially circular cover.

18. The manhole cover support of claim 1 which is for a polygonal cover.

19. The manhole cover support of claim 1 wherein the base portion is substantially a hollow channel, and it and at least part of the keeper portion are formed from a single piece of steel.

20. The manhole cover support of claim 1 wherein the base portion and the keeper portion including the wale are of a single piece of structural metal or structural polymeric material.

21. A manhole cover support comprising a ferrous metal body having a base portion with a cover seat portion, and a lateral keeper portion that is integral with the base portion, the keeper portion *being made of relatively thin metal* projecting upwardly from the seat portion, the base portion having at least one joint adjustable peripherally by a turnbuckle means, the transverse wall thickness of the keeper portion being substantially less than the corresponding transverse wall thickness of the base, the cover support being adapted for raising the effective grade of an existing manhole receiving structure wherein the base portion of the cover support body rests on [the] *a* sill of the receiving structure, [the] *an* outer wall of the base portion faces [the] *an* upwardly-extending shoulder surface of the receiving structure, and expansion of the joint presses the outer wall of the base portion against the shoulder surface of the receiving structure, the cover support including a *relatively rigid, metal* reinforcing wale that is integral with and substantially coextensive with [the] *and adjacent to an* upper part of the keeper portion, *the wale projecting outwardly and downwardly from the upper part of the keeper portion such that at least a portion thereof is in engagement with a confronting surface of the keeper portion and having a width in a lateral direction greater than said transverse wall thickness and extending downwardly from an upper end of said keeper portion for a relatively substantial distance sufficient to provide stiffness against deformation that would occur in conventional, 12–18 ga. steel keepers having very little outward flanging at the top* and a retention component comprising a polymer that is bonded to the outer wall of the base portion.

22. The manhole cover support of claim 21 wherein the base portion and the keeper portion are in the form of a split ring.

23. The manhole cover support of claim 21 wherein the base portion and the keeper portion are in segments.

24. The manhole cover support of claim 21 wherein the wale is substantially solid in cross section.

25. The manhole cover support of claim 21 wherein the wale is mainly hollow.

26. The manhole cover support of claim 21 wherein each adjustable joint is bridged by an extension of the wale.

27. The manhole cover support of claim 26 wherein a tubular or solid shaft fits into and connects pairs of adjacent wale ends.

28. The manhole cover support of claim 26 wherein the wale is substantially rectangular in cross section.

29. The manhole cover support of claim 26 wherein the wale is at least partially arcuate in cross section.

30. The manhole cover support of claim 21 wherein the retention component comprises a foamed elastomer.

31. The manhole cover support of claim 21 wherein the retention component comprises a cured plastisol.

32. The manhole cover support of claim 21 wherein the elevation of its base portion is adjustable by screw means.

33. The manhole cover support of claim 21 which is for a substantially circular cover.

34. The manhole cover support of claim 21 which is for a polygonal cover.

35. The manhole cover support of claim 21 wherein the base portion is mainly a hollow channel, and it and at least part of the keeper portion are formed from a single piece of steel.

36. The manhole cover support comprising a ferrous metal body having a base portion with a cover seat portion, and a lateral keeper portion that is integral with the base portion, the keeper portion projecting upwardly from the seat portion, the base portion having at least one joint adjustable peripherally by turnbuckle means, the transverse wall thickness of the keeper portion being not substantially more than about 0.1 inch, the cover support being adapted for raising the effective grade of an existing manhole receiving structure wherein the base portion of the cover support body rests on [the] *a* sill of the receiving structure, [the] *an* outer wall of the base portion faces [the] *an* upwardly-extending shoulder surface of the receiving structure, and expansion of the joint *means* presses the outer wall of the base portion against the shoulder surface of the receiving structure, the cover support including a *rigid, metal* reinforcing wale that is integral with and substantially coextensive with [the] *and adjacent to an* upper part of the keeper portion, *the wale projecting outwardly and downwardly from the upper part of keeper portion, the reinforcing wale having a width in the lateral direction that is greater than said transverse wall thickness and extending downwardly from an upper end of said keeper portion for a relatively substantial distance sufficient to provide stiffness against deformation that would occur in conventional, 12–18 ga. steel keepers having very little outward flanging at the top*, whereby relatively powerful and indelicate tools, such as picks, pry bars or the like, can be used for removal of a manhole cover without substantial damage to the upper part of the keeper portion.

37. The manhole cover support of claim 36 wherein the base portion and the keeper portion are in the form of a split ring.

38. The manhole cover support of claim 36 wherein the base portion and the keeper portion are in segments.

39. The manhole cover support of claim 36 wherein the wale is substantially solid in cross section.

40. The manhole cover support of claim 36 wherein the wale mainly is hollow.

41. The manhole cover support of claim 36 wherein each adjustable joint is bridged by an extension of the wale.

42. The manhole cover support of claim 40 wherein a tubular or solid shaft fits into and connects pairs of adjacent wale ends.

43. The manhole cover support of claim 40 wherein the wale is substantially rectangular in cross section.

44. The manhole cover of claim 40 wherein the wale is at least partially arcuate in cross section.

45. The manhole cover support of claim 36 wherein a flexible, compressible retention component is interposed between at least part of the outer wall of the base portion and the shoulder surface of the existing receiving structure.

46. The manhole cover support of claim 45 wherein the retention component comprises a polymer bonded to the outer wall of the base portion.

47. The manhole cover support of claim 46 wherein the retention component comprises a foamed elastomer.

48. The manhole cover support of claim 46 wherein the retention component comprises a cured plastisol.

49. The manhole cover support of claim 36 wherein the elevation of its base is adjustable by screw means.

50. The manhole cover support of claim 36 which is for a substantially circular cover.

51. The manhole cover support of claim 36 which is for a polygonal cover.

52. The manhole cover support of claim 36 wherein the base portion is mainly a hollow channel, and it and at least part of the keeper portion are formed from a single piece of steel.

*53. The manhole cover support of claim 36 wherein the wale has a width substantially greater than the corresponding transverse wall thickness of the keeper portion.*

*54. A manhole cover support comprising a body having a base portion with a cover seat portion, and a lateral keeper portion integral with the base portion, the keeper portion projecting upwardly from the seat portion, the base portion having at least one adjustable joint means for adjusting the base in peripheral dimension, the transverse wall thickness of the keeper portion being substantially less than the corresponding transverse thickness of the base, the cover support being adapted for raising the effective grade of an existing manhole cover receiving structure wherein the base portion of the support body rests on a sill of the receiving structure, an outer wall of the base portion faces an upwardly-extending shoulder surface of the receiving structure, and expansion of the joint means presses the outer wall of the base portion against the shoulder surface of the receiving structure, the cover support including a reinforcing wale that is integral with and substantially coextensive with an upper part of the keeper portion, said wale being substantially solid in cross section and defined at least in part by a rod welded adjacent to said upper part of the keeper portion, said rod having at least one transverse dimension that is substantially greater than said transverse wall thickness of said keeper portion.*

*55. The manhole cover support of claim 54 wherein said rod is substantially square in cross section.*

*56. The manhole cover support of claim 54 wherein said rod is substantially rectangular in cross section.*

*57. The manhole cover support of claim 54 further comprising at least one fillet weld for attaching said rod to said keeper portion.*

*58. The manhole cover support of claim 54 further comprising a pair of spaced fillet welds for attaching said rod to said keeper portion.*

* * * * *